Aug. 7, 1956     J. S. KAMBORIAN     2,757,394
APPARATUS FOR STRETCHING COVERING MATERIAL ABOUT
A RIGID FORM AND ADHESIVELY UNITING IT THERETO
Original Filed April 10, 1948

Inventor
Jacob S. Kamborian
by Roberts Cushman Graver
Att'ys ated Aug. 7, 1956

2,757,394

APPARATUS FOR STRETCHING COVERING MATERIAL ABOUT A RIGID FORM AND ADHESIVELY UNITING IT THERETO

Jacob S. Kamborian, West Newton, Mass.

Original application April 10, 1948, Serial No. 20,297, now Patent No. 2,701,003, dated February 1, 1955. Divided and this application June 15, 1954, Serial No. 436,845

8 Claims. (Cl. 12—1)

This invention pertains to machines of the continuous acting type for stretching material about a substantially rigid form and with provision for supplying adhesive for securing the margin of said material after it has been stretched, the present application being a division of my copending application Serial No. 20,297, filed April 10, 1948, upon which Patent No. 2,701,003 issued on February 1, 1955, which is a continuation-in-part of application Serial No. 568,471, filed December 16, 1944, upon which Patent No. 2,467,385 issued on April 19, 1949.

In the above patent there is disclosed apparatus designed to grip the lasting margin of a shoe upper (the "covering material") between oppositely turning power driven gripper rolls while up-drafting stress is applied, the lasting margin being wiped inwardly over an insole secured to a last (said last with its attached insole being the "rigid form") by means of wipers after adhesive has been applied to the inner surface of the lasting margin. As here used, the term "lasting margin" is to be regarded as inclusive of that portion of the upper of a conventional shoe which is lasted in against the insole or its equivalent and also the wrapper or platform-cover of a California, platform or force-lasted shoe.

The present invention has for one object the provision of improved means for stretching and adhesively bonding covering material to a rigid form, and in particular the provision of apparatus of the kind wherein the margin of the covering material is gripped between oppositely rotating rolls while being uninterruptedly stretched and coated with adhesive and wherein an uninterrupted inwiping stress is applied to the marginal material which has been stretched and which has escaped from between the rolls.

A further object is to provide a machine for cement lasting wherein the marginal material is positively supported in inclined position such as to overhang the bottom of the form intermediate the points at which uninterrupted stress for stretching and in-wiping the covering material, respectively, is being applied, with provision for delivering a ribbon of fluid thermoplastic adhesive into the angle between the bottom of the form and the overhanging margin. Other and further objects and advantages of the invention will be pointed out in the following more detailed description and by reference to the accompanying drawings, wherein Fig. 1 is a more or less diagrammatic plan view, partly in horizontal section, illustrating one embodiment of the invention and showing the operation of lasting-in the wrapper of a California type shoe;

Figure 3:
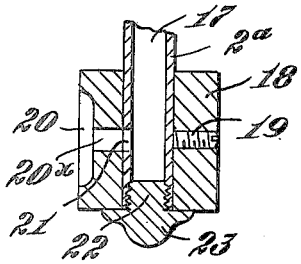
Fig. 3 is a vertical section, to larger scale, on the line 3—3 of Fig. 1, showing the abutment roll of Fig. 1, to larger scale.
Figure 1:
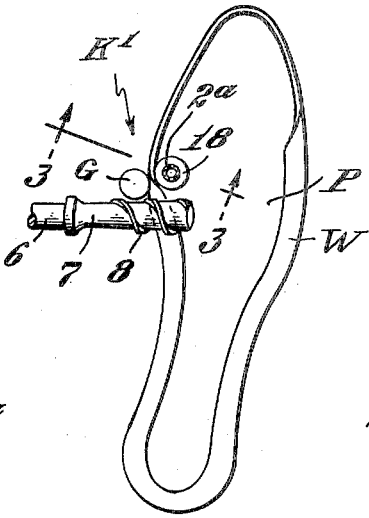
Figure 2:
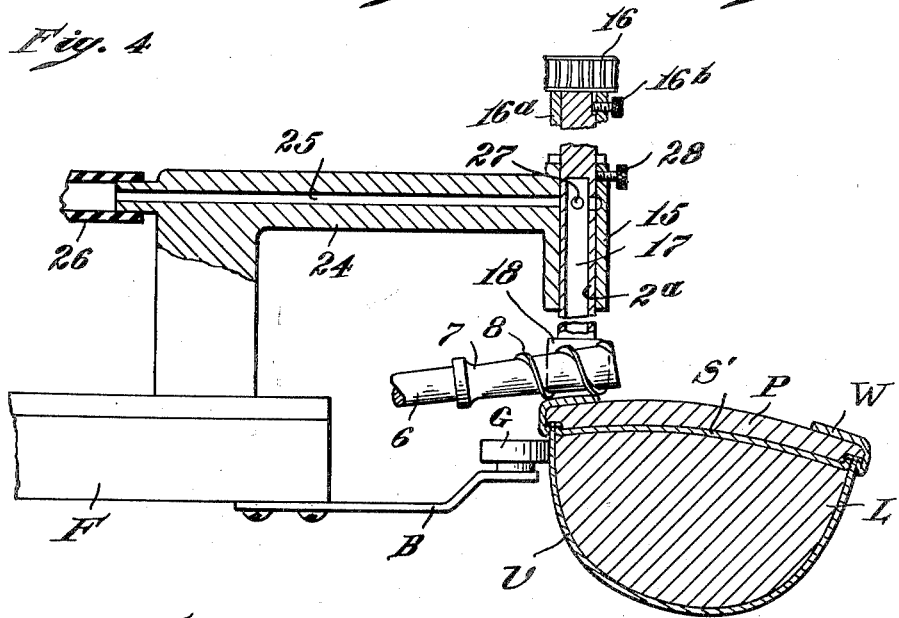
Fig. 2 is a side elevation, partly in vertical section and partly broken away, and to somewhat larger scale than Fig. 1, showing the apparatus of Fig. 1 with the parts in the position which they occupy during the inwiping operation.

Referring to the drawings, the machine is shown as having a single margin-engaging cylindrical abutment roll 18, here shown as having its axis vertical which engages the inner surface of the lasting margin W. There is also provided a constantly rotating helical wiping element 8, here shown as a rib projecting from the peripheral surface of a rigid elongate body 7 which tapers in diameter, its smaller end being fixed to a drive shaft 6 and its larger end being free from contact with other mechanical parts. The periphery of the larger end of the wiper is spaced a short distance from the periphery of the roll 18. The roll 18 in combination with the thrust action of the wiper, suffices to produce the up-drafting stress. As shown in Figs. 1 and 2, the machine is lasting the lasting margin, wrapper, extension or platform cover of a shoe of the California, platform or force-lasted type, having the upper U mounted on the last L, together with plies S' and P of material, here illustrated as constituting a sock lining and a platform or cushion sole, respectively; the wrapper or lasting margin W being secured to the upper proper by a sewed seam. The single roll 18 is carried by a hollow shaft 2ª (Fig. 2) which is mounted in a vertical bearing 15. The shaft 2ª may be provided with a worm gear 16 at its upper end or equivalent driving element. The gear is here shown as having a sleeve or hub portion 16ª which fits over the shaft 2ª and which may be secured to the shaft by a set screw 16ᵇ. The shaft 2ª has an axial passage 17 and the roll 18 is secured to the lower end of the shaft by a set screw 19 (Fig. 3), or its equivalent. As illustrated in Fig. 3, the roll 18 has an orifice 20 in its peripheral surface which communicates, by means of a passage 20ˣ and a port 21, with the passage 17 in the shaft 2ª. The lower end of the passage in the shaft is closed by a screw threaded boss 22 forming part of a holddown button 23. The bearing 15 is carried by an arm 24 forming a part of the machine frame F and which has a longitudinal bore 25 which communicates with the interior of a pipe 26, through which adhesive is supplied, for example by means such as disclosed in the above named Patent No. 2,467,385. The bore 25 communicates with the passage 17 in the shaft 2ª by means of ports 27.

A guide roll G is supported by a bracket B carried by the machine frame F. As here illustrated, the guide roll is so located that its peripheral surface makes a line contact with the upper of the shoe just below the seam which unites the upper to the wrapper W. Preferably the axis of the roll G is in or very close to that vertical plane of the axis of the roll 18 which is perpendicular to the edge of the last at the working point. It will be evident that because the wiper flares in diameter toward its free end, its tendency to wrap the margin about the abutment 18 is greater than though the wiper tapered in the opposite direction or even though it were of uniform diameter.

As illustrated in Fig. 2, the bearing 15 is provided with a screw threaded opening which receives a set screw 23 having a knurled head. If the hollow shaft 2ª is to be rotated, this set screw 28 is retracted, but if the shaft 2ª is to be held stationary, then the set screw 16ᵇ is retracted and the set screw 28 is advanced to hold the shaft in the desired stationary position.

Figure 5:
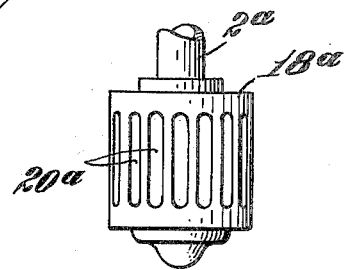
Fig. 5 is an elevation of the abutment roll shown in Fig. 4.
Figure 4:
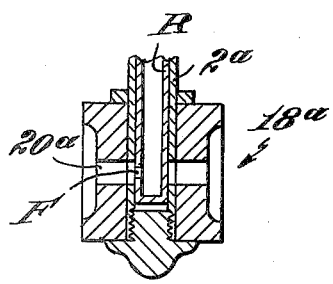
Fig. 4 is a view similar to Fig. 3, but illustrating a modification.

The device may be used in various ways. For example, with the set screw 28 retracted and with the worm gear 16 secured to the shaft by means of the set screw 16ᵇ, power is applied to the worm wheel 16, thus constantly rotating the shaft 2ª. In operation, the operator places the shoe, mounted upon its last, substantially in the position illustrated in Fig. 1, so that the guide roll G contacts the side of the shoe upper and so that the holddown button 23 (Fig. 3) engages the upper surface of the platform sole P and with the upstanding lasting margin or wrapper W contacting the periphery of the roll 18. The operator uninterruptedly moves the shoe in the direction of the arrow K¹ (Fig. 1) assisted by the friction exerted by the rotating roll 18, thus constantly bringing new portions of the lasting margin or wrapper into contact with the roll 18. As the shoe is thus progressively moved forward, the constantly rotating helical wiper element engages the lasting margin and tends to urge the latter inwardly transversely of the edge of the last. Since the roll 18 tends to hold the margin in upright position, that is, substantially perpendicular to the bottom of the shoe and thus oppose free inward bending of the margin, the inward thrust of the helix 8 against the margin at a point closely adjacent to but at one side of the roll 18, bends the lasting margin sharply about the periphery of the roll and thus exerts a substantial up-drafting stress on the margin so as to draw it tightly about the outer edge of the platform P. The lasting margin is thus forced inwardly and over the bottom of the platform, the wiper device pressing the margin down against the bottom of the platform. As the roll 18 revolves, adhesive is exuded through the orifice 20 in roll 18 and is deposited in spaced spots on the inside surface of the lasting margin, and when the margin is laid down onto the bottom surface of the platform P, the adhesive firmly unites the margin to the platform. In order to place the spots of adhesive more closely together, a roll such as shown in Figs. 4 and 5 may be substituted for the roll 18. This roll 18ᵃ has a plurality of peripherally spaced orifices 20ᵃ. With this arrangement it is preferable to mount the rotary roll shaft 2ᵃ on a fixed hollow, coaxial shaft R (Fig. 4) closed at its lower end and having a single orifice F with which the inner ends of the orifices 20ᵃ register successively as the roll turns. As the roll rotates, spots of adhesive are applied to the lasting margin at very frequent intervals so that the spots substantially merge and provide a continuous coating. Preferably, an automatic valve (not shown) similar, for example, to that disclosed in the patent to Kamborian No. 2,467,384, dated April 19, 1949, is provided to cut off the flow of adhesive except when a shoe is being operated on.

Instead of rotating the roll 18 (Figs. 1, 2 and 3), the latter may be made stationary, thus constituting a fixed abutment for cooperation with the wiping device in producing updrafting stress. For such use, the set screw 16ᵇ (Fig. 2) may be retracted and the roll 18 turned by hand until the orifice 20 is disposed in position to deliver adhesive to the inner surface of the lasting margin at the place where the latter is bent around the roll. The set screw 28 is now tightened so as to hold the shaft 2ᵃ and roll 18 in this position. With this arrangement the adhesive flows from the roll 20 and forms a continuous band on the inner surface of the lasting margin as the shoe is progressed. If both set screws 16ᵇ and 28 be loosened, the roll 18 will rotate solely by the friction of the stock as the shoe is fed forward by the operator.

While various modifications have been illustrated, it is to be understood that the invention is broadly inclusive of any and all such other arrangements and modifications as fall within the scope of the appended claims. It is further to be understood that when such words as "up," "down," "below," "above," etc, have been employed herein they are used in a relative sense and with respect to the drawings and for convenience only and are not to be regarded as limitations with respect to the mode of operating the apparatus.

As herein disclosed the stretching of a shoe upper over a last is instanced as one specific utility of the invention.

The stretching of a cover over the cushioning pad of a chair seat may be instanced as another utility, it being understood that the last and the chair bottom, respectively, are examples of rigid or substantially rigid "forms," and that the shoe upper and the cover for the chair seat cushion are cited as examples of "coverings" of stretchable material, which, in accordance with the present invention, are drawn snugly about such form.

I claim:

1. A machine for stretching flexible covering material about a form having a ply of material attached to its bottom, said machine comprising a hold-down engageable with the exposed surface of the ply material attached to the bottom of the form, an abutment element which has a convex, cylindrically curved peripheral surface engageable with the inner surface of the marginal portion of the covering material and so arranged as to tend to hold said marginal portion upright, wiping means operative uninterruptedly to engage and to apply in-wiping stress to the marginal portion of the covering material just to the rear of the abutment element in the direction of movement of the form, so as partially to wrap the marginal portion of the covering material about the convex peripheral surface of the abutment and thereby to stretch the covering material about the form, the wiping means being so constructed and arranged that any point on the marginal portion of the covering material which is engaged by the wiping means is progressively forced by the latter closer and closer to the abutment element, means for actuating the wiping means, and means operative to exude liquid adhesive into the angle between the upright marginal portion of the covering and the exposed surface of said ply of material just prior to the application of in-wiping stress, said last-named means including a part which directly contacts the marginal material and which has an orifice in its margin-contacting surface through which the liquid exudes.

2. A machine for stretching flexible covering material about a substantially rigid form having a ply of material attached to its bottom, said machine having a gauge roll designed to make substantially a line-contact with the outer surface of the covering material, a hold-down designed to contact the exposed surface of the ply of material attached to the bottom of the form, an abutment roll having a substantially cylindrical, convexly curved surface designed to contact the inner surface of the marginal portion of the covering material and so located that the cylindrical surface of said abutment roll, where it contacts the inner surface of said marginal portion of the covering material, is very close to the vertical plane through the axis of the gauge roll and the line of contact of the gauge roll with the outer surface of the covering material, an elongate rotary wiper fixed at one end to a constantly rotating shaft, the axis of the wiper being so arranged, relatively to a plane through the axes of the gauge and abutment rolls that the other end of the wiper is located inwardly beyond the edge of the form, said latter end of the wiper being free from contact with other mechanical parts and being of larger diameter than the end which is fixed to the shaft, said wiper comprising a helical work-engaging element operative uninterruptedly to engage and to apply in-wiping stress to the marginal portion of the covering material at a point just to the rear of the abutment roll in the direction of movement of the form, thereby partially to wrap the marginal portion of the covering material about the abutment and to urge it inwardly and over the bottom of the form, and means for rotating the wiper.

3. A machine for stretching flexible covering material about a substantially rigid form having a ply of material attached to its bottom, said machine including in combination, a rotary wiper which tapers in diameter from one end toward the other, means for rotating the wiper whereby it exerts in-wiping stress upon the margin of the covering material, a hold-down engageable with the exposed surface of the ply of material attached to the bottom of the form, an abutment having a substantially vertical peripheral surface, curved in horizontal section and engageable with the inner surface of the margin of the covering material and about which the covering material is bent by the wiper as the latter rotates, the wiper being so arranged that its larger end is adjacent to the abutment, the abutment having a delivery orifice in its peripheral surface, and means for supplying fluid adhesive under pressure for delivery in liquid form through said orifice.

4. A machine for stretching flexible covering material about a substantially rigid form having a ply of material mounted on its bottom, said machine comprising, in combination, a rotating helical wiping element operative uninterruptedly to engage the outer surface of the margin of the covering material, a hold-down engageable with the exposed surface of the ply which is mounted on the bottom of the form, a freely rotatable abutment element associated with the hold-down and having a substantially vertical cylindrical surface which engages the inner surface of the margin of the covering material and about which the covering material is bent by the wiping element, said cover-engaging face of the abutment reaching down nearly to the exposed surface of the ply mounted on the bottom of the form, the abutment having a delivery orifice in its peripheral surface, and means operative to cause liquid adhesive to exude through said orifice into direct contact with the inner surface of the covering material.

5. A machine for stretching flexible covering material about a substantially rigid form, said machine having, in combination, a rotating wiper element operative uninterruptedly to engage the margin of the covering material and to urge the latter inwardly over the bottom of the form, the wiper comprising an elongate body portion embraced by a helical work-engaging rib, a rotary cylindrical abutment located just in advance of the vertical plane of the axis of the wiper, the abutment engaging the inner surface of the margin of the covering material to resist its bending inwardly over the bottom of the form, the abutment having an axial bore and a delivery passage extending from said bore to the peripheral surface of the abutment through which adhesive may flow into direct contact with the inner surface of the marginal portion of the covering material, a rotary hollow shaft on which the abutment is mounted, the shaft having a port providing communication between its interior and the passage in the abutment, means for applying hot thermoplastic adhesive to the interior of the shaft, and means for rotating the wiper.

6. A machine for stretching flexible covering material about a substantially rigid form, said machine having, in combination, an elongate rotating wiper element which tapers in diameter from one end toward the other and which is operative uninterruptedly to engage the margin of the covering material and to urge the latter inwardly over the bottom of the form, a substantially cylindrical, rotary abutment located just in advance of the vertical plane of the axis of the wiper element as the form is progressed, the larger end of the tapering wiper element being adjacent to the abutment and being operative to press the margin of the covering material against the peripheral surface of the abutment, the abutment having an axial bore and a passage leading outwardly therefrom for the delivery of liquid into direct contact with the inner surface of the marginal portion of the covering material, means for rotating the abutment, and means for supplying liquid adhesive to said passage.

7. A machine for stretching flexible covering material about a substantially rigid form, said machine having a wiper comprising a cover-contacting wiping element whose instant point of contact with the cover progresses in the same direction inwardly and transversely across the edge of the bottom of the form, means for thus moving the wiping element while the form is so moved relatively to the wiping element as progressively to present successive portions of the margin of the covering material for engagement by the wiping element, a rotatable abutment member having a cylindrical surface arranged to engage the inner surface of the margin of the covering material just in advance of the wiping element and which, by such engagement, opposes free inward bending of the margin whereby the latter is subjected to up-drafting stress as it is urged inwardly by the wiper, the wiping element and the abutment member collectively constituting the sole means for applying stretching force to the covering material, the rotatable abutment member having a plurality of circumferentially spaced orifices in its peripheral, cover-engaging surface, and means operative to cause liquid to exude through said orifices into direct contact with the covering material.

8. A machine for stretching flexible covering material about a substantially rigid form, said machine having a constantly rotating helical, cover-contacting wiping element which extends across the edge of the form and whose diameter increases toward that end which is located inwardly of the edge of the form, means for rotating the wiping element while the form is so moved relatively to the wiping element as progressively to present successive portions of the margin of the covering material for engagement by the wiping element, a rotatable abutment member arranged to engage the inner surface of the margin of the covering material just in advance of the wiping element, the rotatable abutment having an orifice in its peripheral cover-engaging surface, a hollow shaft on which the abutment is mounted, the shaft having a port providing communication between its interior and said orifice, means whereby the shaft may be rotated, means whereby the abutment may be caused alternatively to rotate with the shaft or to be held stationary while the shaft rotating means continues to operate, and means for supplying fluid under pressure to the interior of the hollow shaft for delivery through said orifice.

References Cited in the file of this patent

UNITED STATES PATENTS

| | | |
|---|---|---|
| 2,222,778 | MacKenzie | Nov. 26, 1940 |
| 2,252,284 | Kamborian | Aug. 5, 1941 |
| 2,438,917 | Kamborian | Apr. 6, 1948 |
| 2,438,918 | Kamborian | Apr. 6, 1948 |
| 2,455,694 | Miller | Dec. 7, 1948 |